United States Patent
Lee et al.

(10) Patent No.: US 10,536,431 B2
(45) Date of Patent: Jan. 14, 2020

(54) ON-NODE DHCP IMPLEMENTATION FOR VIRTUAL MACHINES

(71) Applicant: Microsoft Technology Licensing, LLC, Redmond, WA (US)

(72) Inventors: Young Lee, Sammamish, WA (US); Sheng Lu, Redmond, WA (US); Xinyan Zan, Sammamish, WA (US); Daniel M. Firestone, Seattle, WA (US); Harish Kumar Chandrappa, Bothell, WA (US); Anil Ingle, Woodinville, WA (US); Jayesh Kumaran, Redmond, WA (US)

(73) Assignee: Microsoft Technology Licensing, Redmond, WA (US)

(*) Notice: Subject to any disclaimer, the term of this patent is extended or adjusted under 35 U.S.C. 154(b) by 0 days.

(21) Appl. No.: 15/966,612

(22) Filed: Apr. 30, 2018

(65) Prior Publication Data
US 2019/0334858 A1    Oct. 31, 2019

(51) Int. Cl.
*H04L 29/12* (2006.01)
*G06F 9/455* (2018.01)

(52) U.S. Cl.
CPC ...... *H04L 61/2015* (2013.01); *G06F 9/45558* (2013.01); *H04L 61/2061* (2013.01); *G06F 2009/45595* (2013.01)

(58) Field of Classification Search
CPC ............ H04L 61/2015; H04L 61/2061; G06F 9/45558; G06F 2009/45595
See application file for complete search history.

(56) References Cited

U.S. PATENT DOCUMENTS

| | | | |
|---|---|---|---|
| 2013/0024553 A1* | 1/2013 | Mittal | H04L 41/0893 709/222 |
| 2015/0058463 A1 | 2/2015 | Wang et al. | |
| 2015/0180824 A1 | 6/2015 | Atanasov | |

OTHER PUBLICATIONS

"International Search Report and Written Opinion Issued in PCT Application No. PCT/US19/026693", dated Jun. 4, 2019, 10 Pages. 10pgs.

* cited by examiner

*Primary Examiner* — Dady Chery
(74) *Attorney, Agent, or Firm* — Buckley, Maschoff & Talwalkar LLC

(57) ABSTRACT

A DHCP server implementation includes transmission of a DHCP packet from a virtual machine executing on a server node to a node agent executing on the server node, generation, by the node agent, of a DHCP response packet based on the DHCP packet and on DHCP information previously stored in a local memory of the server node, and transmission of the DHCP response packet from the node agent to the virtual machine. Neither the DHCP packet transmitted by the virtual machine nor the DHCP response packet are transmitted out of the server node.

19 Claims, 7 Drawing Sheets

ON-NODE DHCP IMPLEMENTATION FOR VIRTUAL MACHINES

BACKGROUND

Networked computing devices communicate with one another over Transmission Control Protocol/Internet Protocol (TCP/IP). A networked device must be associated with a network address (e.g., an IP address) in order to communicate with other networked devices over a TCP/IP network. Dynamic Host Configuration Protocol (DHCP) is a network management protocol for dynamically assigning network addresses and other configuration parameters to networked devices. Generally, a DHCP server receives a DHCP request from a networked device and assigns an IP address and configuration parameters to the requesting device.

Distributed computing networks may include several hardware servers, each of which requires a dedicated IP address. Hardware servers may host one or more virtual machines, each of which also requires a dedicated IP address to independently communicate with other network components. Conventionally, IP addresses are assigned to hardware servers and their virtual machines by a centralized DHCP server. The centralized DHCP server is accessible over a physical network to which the hardware servers are connected.

A centralized DHCP server may present reliability, scalability and debuggability challenges. If a centralized DHCP server malfunctions or is otherwise unavailable, all hardware servers and virtual machines served by this DHCP server are impacted. With increased server cluster sizes and virtual machine densities, a single DHCP server may quickly become overwhelmed with DHCP traffic and its corresponding processing requirements. Moreover, DHCP discover and DHCP request packets require broadcast functionality in the physical network, which complicates physical network configuration (e.g., often requiring a DHCP relay) and end-to-end debugging of the DHCP channel.

DHCP implementations which address one or more of the foregoing issues are desired.

DETAILED DESCRIPTION

The following description is provided to enable any person in the art to make and use the described embodiments. Various modifications, however, will remain readily-apparent to those in the art.

Some embodiments provide a technical solution to the above-described technical problems posed by a centralized DHCP server implementation in a distributed environment. Technical features according to some embodiments include caching of a predetermined networking state on a network node, intercepting, before layer-2 routing, a DHCP packet transmitted by a virtual machine hosted on the node, generating a DHCP response to the DHCP packet based on the cached networking state, and providing the DHCP response to the virtual machine.

By implementing DHCP support for a virtual machine on the node hosting the virtual machine, the overall DHCP load may be distributed and scalability may be improved. Some embodiments may improve the reliability of DHCP support and the ability to troubleshoot DHCP faults by shortening the DHCP communication channel and removing dependencies on the physical network and on broadcast support.

Figure 1:
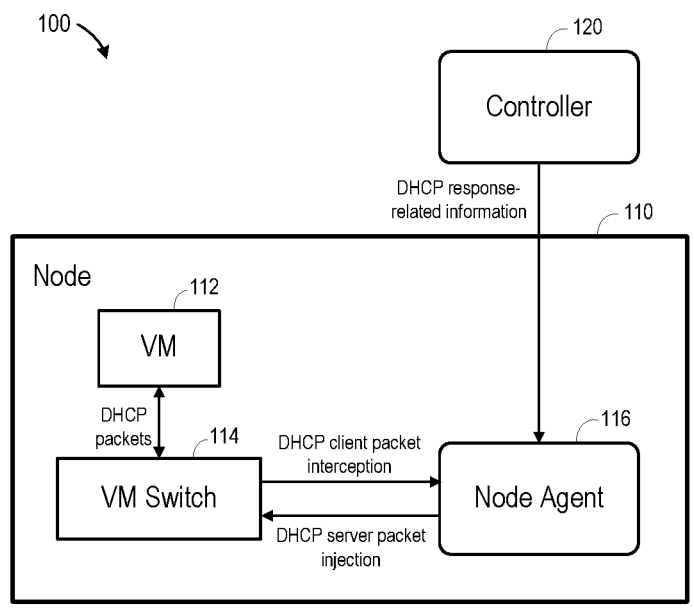
FIG. 1 illustrates an on-node DHCP implementation for virtual machines according to some embodiments.

FIG. 1 illustrates an on-node DHCP implementation for virtual machines according to some embodiments. Briefly, node agent 116 of server node 110 receives DHCP response-related information from controller 120 during or after allocation of virtual machine 112 on server node 110. The DHCP response-related information may include information specifying a desired networking configuration of virtual machine 112 executing on server node 110.

Virtual machine 112 issues DHCP discover and request packets as is known in order to obtain an IP address via DHCP. These packets are intercepted by virtual machine switch 114 and node agent 116 generates appropriate DHCP offer/ack packets based on the DHCP response-related information received from controller 120. The generated DHCP offer/ack packets are reinjected back to virtual machine 112 through virtual machine switch 114.

Server node 110 may comprise a traditional standalone computing device, a server blade mounted in a rack of several server blades, or any other set of hardware providing networking, compute, and storage resources. Node 110 executes a host operating system which supports the execution of one or more virtual machines. The one or more virtual machines may access and use allocated portions of the networking, compute, and storage resources of server node 110. Accordingly, virtual machine 112 is an abstraction of the networking, compute, and storage resources of server node 110. Virtual machine 112 may execute its own operating system, on which one or more applications may execute.

Virtual machine switch 114 provides a connection between virtual machine 112 (and any other virtual machines executing on server node 110) and external networks on different subnets. Virtual machine switch 114 may comprise a software-based layer-2 Ethernet network switch component of the host operating system of server node 110. Virtual machine switch 114 may support callout drivers for providing extensible functionality as will be described below. Node agent 116 may also be a component of the host operating system of server node 110.

Controller 120 may manage all virtual machines and nodes in a node cluster of one or more nodes. Accordingly, controller 120 may provide DHCP response-related information for a plurality of virtual machines being hosted on each of a plurality of nodes such as node 110. Controller 120 may communicate with network devices, services and components to discover network devices, detect service configurations and transmit configuration information to the network. Controller 120 may provide an interface to a management application to allow a user to configure, monitor, troubleshoot and deploy devices within the network.

Figure 2:
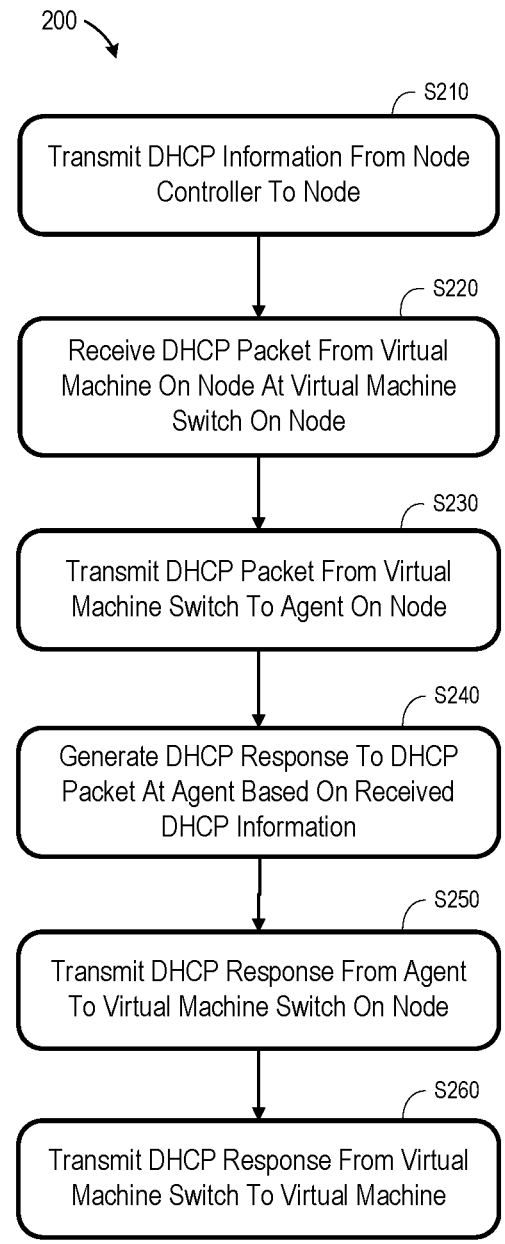
FIG. 2 is a flow diagram of a process to provide on-node DHCP responses according to some embodiments.

FIG. 2 comprises a flow diagram of process 200 to provide an on-node DHCP implementation according to some embodiments. In some embodiments, processing units (e.g., one or more processors, processing cores, processor threads) of a server node execute software program code to cause the node to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, DHCP information is transmitted from a node controller to a node. With reference to FIG. 1, controller 120 may transmit DHCP response-related information to node agent 116 of server node 110. The DHCP response-related information may be generated during allocation of virtual machine 112 on server node 110, and may be transmitted during or after allocation of virtual machine 112 on server node 110. According to some embodiments, the DHCP response-related information is transmitted via a dedicated communication channel established between controller 120 and node agent 116. Node agent 116 caches the received information within a file system located on server node 110.

The DHCP response-related information specifies a networking configuration associated with virtual machine 112. The information may include information based on which a DHCP response packet may be generated, for example, the Media Access Control (MAC) address of virtual machine 112, the IP address of virtual machine 112, a DHCP server IP address, the IP address of the default gateway, a subnet mask, Domain Name Service server settings, a domain name, and routes. According to some embodiments, the transmitted DHCP response-related information includes a binary-formatted DHCP response packet. Any other information may be included in the DHCP response-related information, such as but not limited to an interface type, virtual network information (e.g., an IP address of virtual machine 112 and a subnet mask in a virtual address space), and network Access Control Lists.

Next, at S220, a virtual machine switch located on the node receives a DHCP request packet from a virtual machine executing on the node. For example, virtual machine 112 of node 110 includes a virtual Network Interface Controller (NIC) which is connected to virtual machine switch 114 through a switch port. Virtual machine 112 may issue a DHCP discover packet in order to initiate a DHCP session, and virtual machine switch 114 receives the packet at S220.

Prior to S220, and according to some embodiments, node agent 116 registers an interception handler with virtual machine switch 114 for DHCP discover and request packets. Virtual machine switch 114 calls this interception handler upon receiving a DHCP discover or request packet. In some embodiments, virtual machine switch 114 provides a filter engine that supports the registration of callout kernel-mode drivers such as the interception handler. Accordingly, the filter engine of virtual machine switch 114 calls the interception handler in response to receiving the DHCP discover packet at S220, resulting in transmission of the packet to the interception handler of node agent 116 at S230.

Node agent 116 generates an appropriate DHCP response to the DHCP discover packet at S240. The response is based on the DHCP response-related information received from controller 120 at S210. In the present example, the response to the DHCP discover packet is a DHCP offer packet and includes a MAC address, the offered IP address, the subnet mask, the lease duration, and the IP address of the DHCP server. As described above, all of this information has been previously received from controller 120 at S210 and is available on node 110. Node agent 116 therefore has all of the information required to generate the DHCP response.

The generated DHCP offer packet is transmitted from node agent 116 to virtual machine switch 114 at S250, by virtue of the callback mechanism. This reinjected packet is then transmitted back to virtual machine 112 using normal TCP/IP routing protocols at S260. S230 through S260 may repeat for a subsequent DHCP request packet sent from virtual machine 112 and corresponding DHCP acknowledge packet generated by node agent 116, in order to complete the DHCP session. Accordingly, a complete DHCP session may be supported without requiring layer-2 forwarding of any DHCP packets out of node 110.

In some embodiments, controller 120 transmits DHCP information to node 110 in response to each change to the network configuration.

Figure 3:
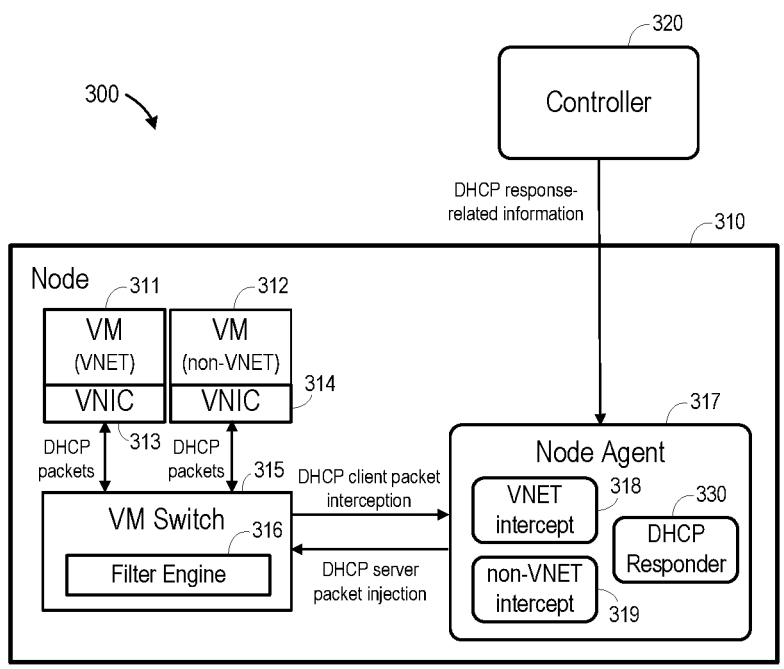
FIG. 3 illustrates an on-node DHCP implementation for virtual machines according to some embodiments.

FIG. 3 illustrates an on-node DHCP implementation for virtual machines according to some embodiments. System 300 may comprise an implementation of system 100 of FIG. 1. As described above with respect to system 100, node agent 317 receives packets intercepted by virtual machine switch 315, generates appropriate DHCP offer/ack packets based on DHCP response-related information received from controller 320, and reinjects the DHCP offer/ack packets back to virtual machine switch 314.

Node 310 of system 300 hosts virtual machine 311 associated with a virtual network and virtual machine 312 which is not associated with a virtual network. More specifically, virtual machine 311 is associated with a virtual IP address space that is independent of the IP address space of the physical network to which node 310 is connected. The virtual IP address space is defined within the configuration of virtual machine 311.

FIG. 3 also depicts virtual NICs 313 and 314, which are respectively associated with virtual machine 311 and virtual machine 312 and which connect to respective ports of virtual machine switch 315. Virtual machine switch 315 includes filter engine 316 which may operate as described above.

Figure 4:
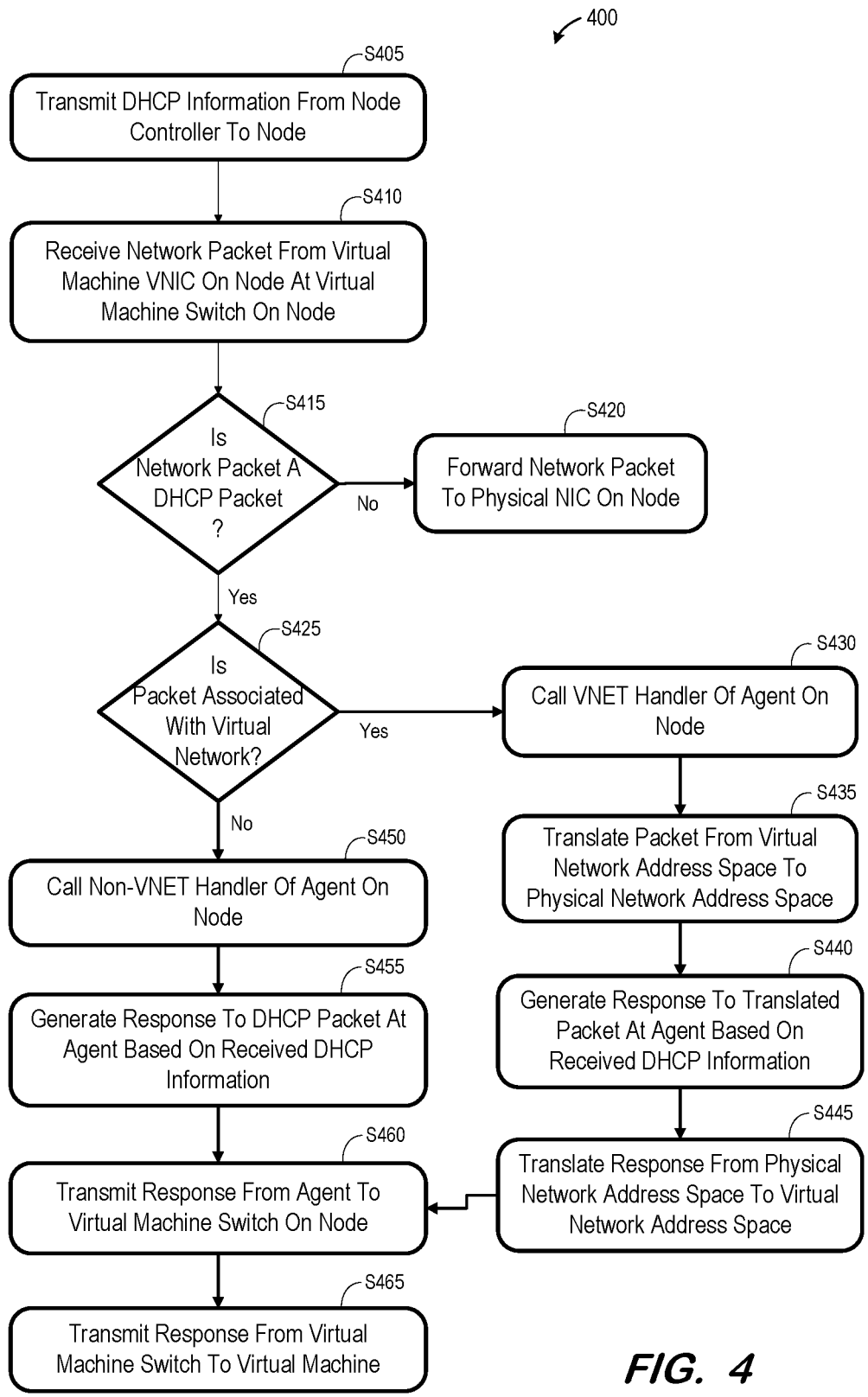
FIG. 4 is a flow diagram of a process to provide on-node DHCP responses according to some embodiments.

FIG. 4 comprises a flow diagram of process 400 according to some embodiments. Process 400 will be described with respect to system 300, but embodiments are not limited thereto.

DHCP information is transmitted from a node controller to a node at S405 as described above with respect to S210. Referring to FIG. 4, controller 320 may transmit DHCP response-related information to node agent 317 of node 310. The DHCP response-related information may specify a networking configuration for each virtual machine hosted on node 310.

A virtual machine switch located on the node receives a network packet from a virtual machine hosted on the node at S410. For example, virtual machine switch 315 may receive a network packet from virtual NIC 313 associated with virtual machine 311. At S415, virtual machine switch 315 determines if the received network packet is a DHCP discover or request packet. The determination may be based on a callback registered with filter engine 316 which is to be invoked upon receipt of such packets. If the received network packet is not a DHCP discover or request packet, virtual machine switch 315 forwards the packet at S420 to the physical network via a physical NIC of node 310.

Flow proceeds to S425 if it is determined at S415 that the network packet is a DHCP packet. At S425, it is determined whether the packet is associated with a virtual network. For example, filter engine 316 may determine that the packet was received from virtual NIC 313, which is associated with a virtual network. In this case, filter engine 316 calls virtual network interception handler 318 of node agent 317 at S430.

In the illustrated embodiment, node agent 317 includes virtual network interception handler 318 for handling intercepted DHCP packets which were issued from a virtual machine associated with a virtual network, and interception handler 319 for handling intercepted DHCP packets issued from a virtual machine which is not associated with a virtual network. Virtual network interception handler 318 translates the network packet from its virtual network address space to a physical network address space at S435. A mapping or other information for performing this translation may be included in the information received from controller 320 at S405.

DHCP responder 330 generates an appropriate DHCP response to the address-translated DHCP packet at S440. The response is generated based on the DHCP response-related information received from controller 320 at S405 and reflects the IP address space of the physical network. Virtual network interception handler 318 then translates the generated DHCP response from the physical network address space to the virtual network address space at S445.

The DHCP response packet is transmitted from node agent 317 to virtual machine switch 315 at S460 based on the original callback. This reinjected packet is then transmitted back to virtual machine 311 in the virtual address space using normal TCP/IP routing protocols at S465.

If it is determined at S425 that the packet is not associated with a virtual network (e.g., the packet was received from virtual NIC 314 of virtual machine 312), filter engine 316 calls interception handler 319 of node agent 317 at S450. Handler 319 does not perform an address translation, and DHCP responder 330 generates an appropriate DHCP response to the non-translated DHCP packet at S450 based on the DHCP response-related information received from controller 320. Flow then continues through 460 and 465 as described above to return the DHCP response to virtual machine 312.

Figure 5:
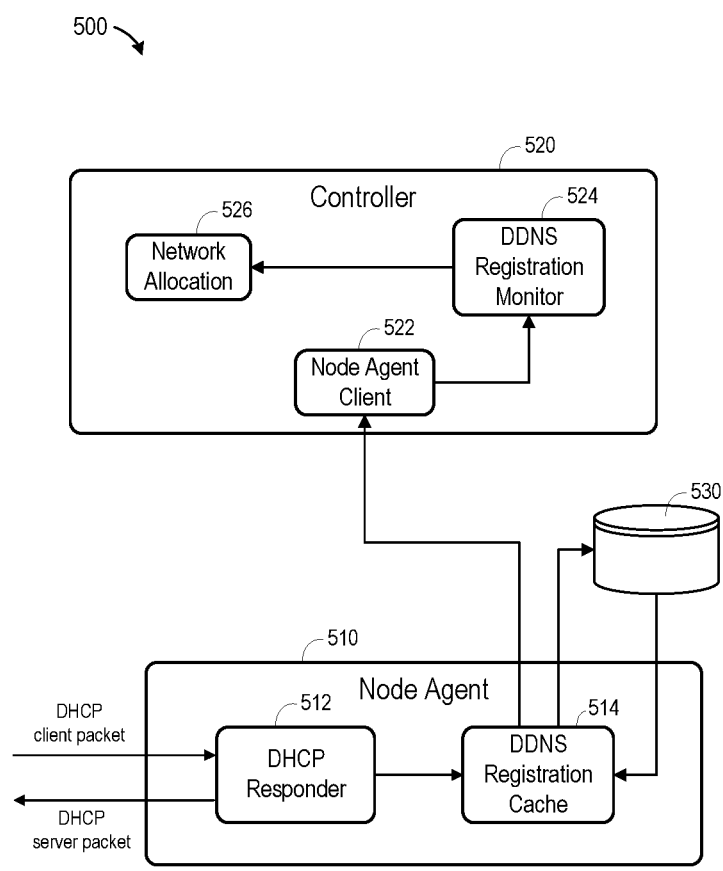
FIG. 5 illustrates Dynamic Domain Name Server support according to some embodiments.

FIG. 5 illustrates architecture 500 to support Dynamic DNS (DDNS) registration according to some embodiments. Generally, DDNS registration information is provided to a node controller via a synchronization request which is regularly called by the controller (e.g., every 10 seconds). The controller then updates the DNS server with latest DDNS mapping.

More particularly, a virtual machine located on the node transmits a DHCP request packet including a DDNS host name. As described above, node agent 510 intercepts the packet and forwards it to DHCP responder 512. Since the packet includes DDNS registration information, DHCP responder 512 calls DDNS registration cache 514 to cache the DDNS registration information. DDNS registration cache 514 asynchronously executes a background thread to persist the DDNS registration information to disk 530 without blocking DHCP responder 512 from reinjecting the DHCP response as described above. DDNS registration cache 514 will load the persisted DDNS registration information from disk 530 whenever node agent 510 restarts.

Node agent client 522 of controller 520 periodically calls a synchronization routine (e.g., via a GetStateRequest API), and DDNS registration cache 514 of node agent 510 responds with the DDNS registration information and DHCP status. Node agent client 522 stores the DDNS registration information into DDNS registration monitor 524. DDNS registration monitor 524 wakes up based on the event, and creates a DDNS programming task in network allocation data model 526. DDNS registration monitor 524 relieves node agent client 522 from having to write a transaction. According to alternative embodiments, node agent 510 publishes the DDNS registration information to PubSub and controller 520 (or the DNS server) subscribes thereto.

Figure 6:
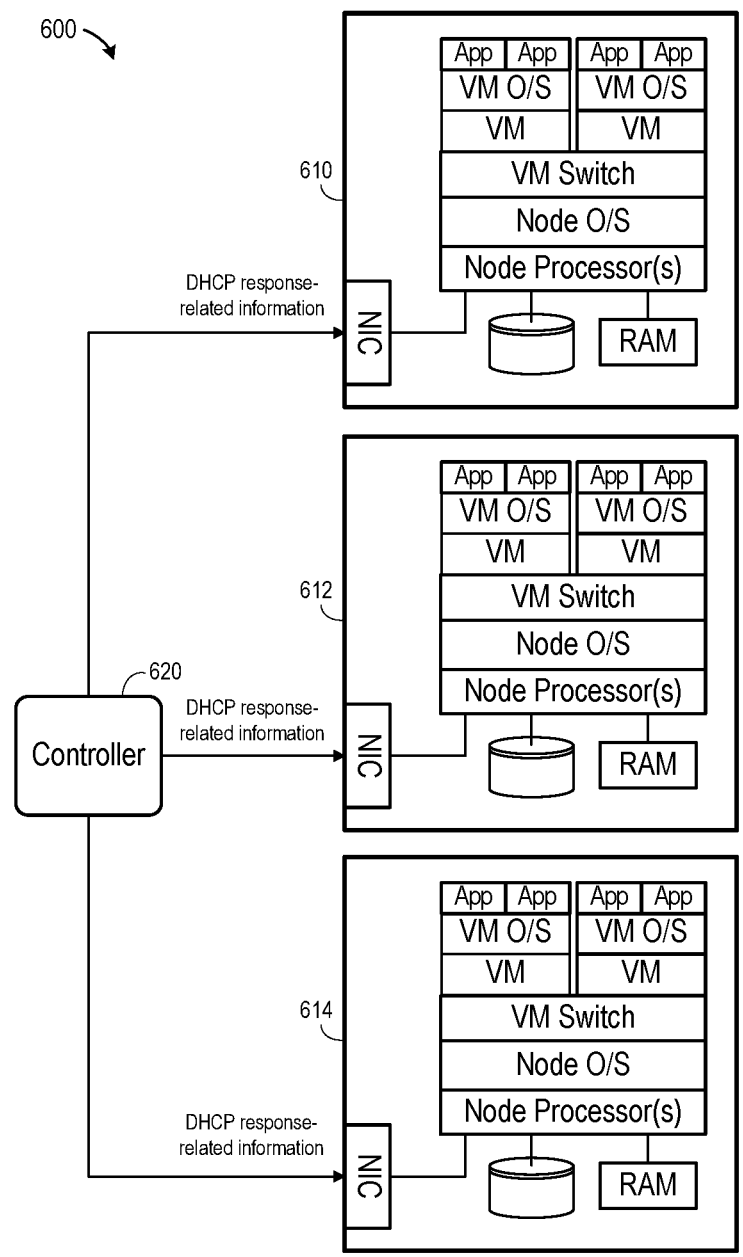
FIG. 6 illustrates a plurality of server nodes providing on-node DHCP implementation according to some embodiments.

FIG. 6 illustrates network infrastructure 600 implementing on-node DHCP support according to some embodiments. Network infrastructure 600 comprises server nodes 610, 612 and 614, each of which may execute multiple virtual machines. Each virtual machine may be configured to utilize a dedicated amount of RAM, disk space or other storage, and processing resources of its hosting node.

Nodes 610, 612 and 614 may be traditional standalone computing devices and/or individual blades in a rack of many blade servers. Each of nodes 610, 612 and 614 includes a NIC that manages communication with an external physical network. One or more node processors on each node executes a host operating system that supports multiple virtual machines. Although the virtual machine switch of each node is illustrated separately, the host operating system may include a virtual machine switch and a node agent to operate as described herein. Controller 620 may provide node agents on each of nodes 610, 612 and 614 with DHCP response-related information as described above.

Each virtual machine may execute its own operating system which may be the same or different than the operating system executed on any other virtual machine. Each virtual machine may run one or more applications on its operating system. Each of nodes 610, 612 and 614 also includes storage (e.g., hard disk drives) and memory (e.g., RAM) that can be accessed and used by the node processors and virtual machines. In other architectures, some nodes may be dedicated to storage and while other nodes are dedicated to executing virtual machines.

According to some embodiments, nodes 610, 612 and 614 belong to a single cluster. Grouping nodes into a cluster may allow for workload sharing via a load balancer, enable a single point of operation/management via a controller such as controller 620, and/or provide a path for scaling to meet increased demand. Routers and/or network switches may support data traffic between nodes 610, 612 and 614, and between infrastructure 600 and external resources and users.

Figure 7:
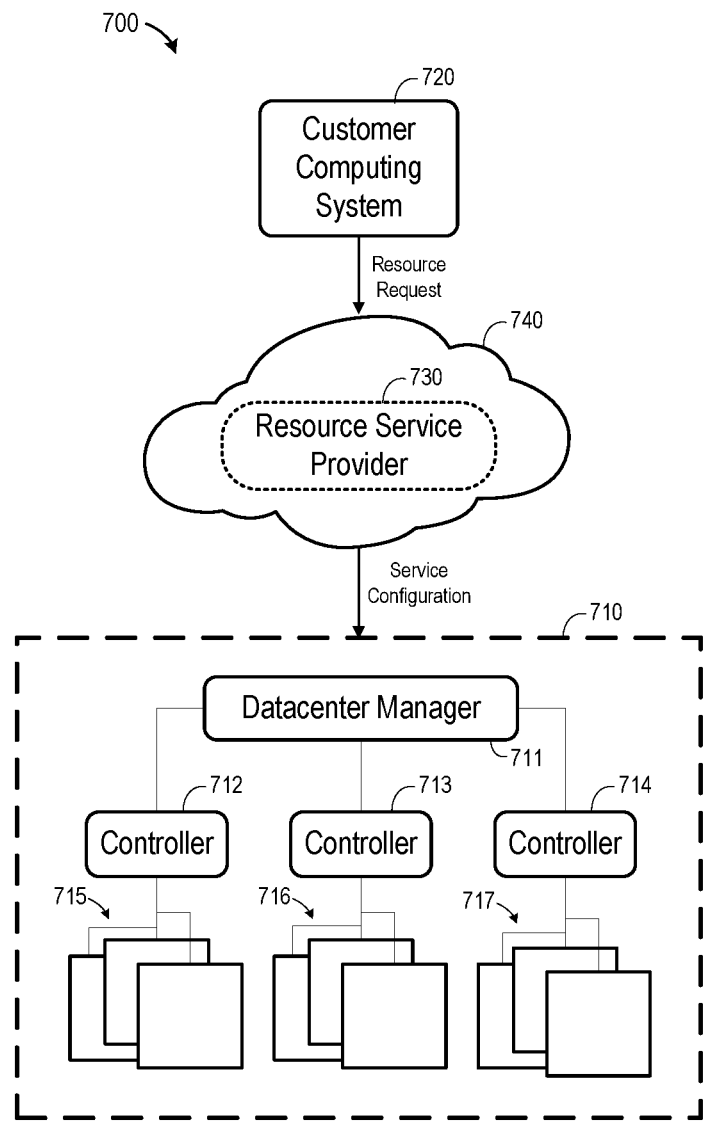
FIG. 7 illustrates an architecture for providing on-demand services and on-node DHCP implementation according to some embodiments.

FIG. 7 illustrates architecture 700 including datacenter 710. Datacenter 710 may provide "cloud computing" services to customers in some embodiments. Datacenter 710 includes server clusters 715, 716 and 717. One or more nodes of each server cluster 715, 716 and 717 may provide on-node DHRP support as described herein. Each cluster is controlled by a dedicated controller 712, 713 or 714, each of which is in turn managed by datacenter manager 711.

According to some embodiments, customer computing system 720 requests resources from resource service provider 730 located in public cloud 740. The request may specify datacenter resources and architectures, and may include configuration information of any level of specificity. Based on the request, resource service provider 730 transmits service configuration information to datacenter 710.

Datacenter 710 configures its resources based on the configuration information to provide the requested resources. For example, datacenter manager 711 may transmit information to controllers 712, 713 and 714 to instantiate a number of virtual machines having various characteristics (including but not limited to virtual network address spaces) within clusters 715, 716 and/or 717.

The elements of datacenter 710 may be distributed and/or mirrored to multiple locations to provide redundancy and disaster recovery. For example, the datacenter may designate one virtual machine on one node as the primary location for an application and a second virtual machine on the same or different node as a standby or back-up in case the primary virtual machine or node fails. Datacenter manager 711 may automatically shift incoming user requests from the primary virtual machine to the back-up virtual machine without requiring intervention.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A server node comprising:
   one or more processors executing a host operating system, the host operating system hosting one or more virtual machines and comprising a node agent and a virtual machine switch; and
   a memory,
   wherein the server node is operable to:
   transmit a Dynamic Host Control Protocol packet from a virtual machine of the one or more virtual machines;
   receive the Dynamic Host Control Protocol packet from the virtual machine at the virtual machine switch;
   transmit the Dynamic Host Control Protocol packet from the virtual machine switch to the node agent;
   receive the Dynamic Host Control Protocol packet at the node agent;
   generate, by the node agent, a Dynamic Host Control Protocol response packet based on the Dynamic Host Control Protocol packet and on Dynamic Host Control Protocol information stored in the memory;
   transmit the Dynamic Host Control Protocol response packet from the node agent to the virtual machine switch; and
   transmit the Dynamic Host Control Protocol response packet from the virtual machine switch to the virtual machine.

2. A server node according to claim 1, the server node further operable to:
   in response to receipt of the Dynamic Host Control Protocol packet at the virtual machine switch, identify a handler of the node agent which is registered with the virtual machine switch and associated with the Dynamic Host Control Protocol packet, and call the handler to transmit the Dynamic Host Control Protocol packet from the virtual machine switch to the node agent.

3. A server node according to claim 1, the server node operable to:
   receive, by the node agent, the Dynamic Host Control Protocol information from a controller executing on a controller node; and
   store the Dynamic Host Control Protocol information in the memory.

4. A server node according to claim 1, wherein the Dynamic Host Control Protocol information comprises a Media Access Control address of the virtual machine, an offered Internet Protocol address, a subnet mask, and a Dynamic Host Control Protocol server Internet Protocol address.

5. A server node according to claim 1, wherein the Dynamic Host Control Protocol packet comprises a Dynamic Host Control Protocol discover packet and the Dynamic Host Control Protocol response packet comprises a Dynamic Host Control Protocol offer packet, the server node further operable to:
   transmit a Dynamic Host Control Protocol request packet from the virtual machine;
   receive the Dynamic Host Control Protocol request packet at the node agent;
   generate, by the node agent, a Dynamic Host Control Protocol acknowledge packet based on the Dynamic Host Control Protocol request packet; and
   transmit the Dynamic Host Control Protocol acknowledge packet from the node agent to the virtual machine.

6. A server node according to claim 5, wherein neither the Dynamic Host Control Protocol discover packet, the Dynamic Host Control Protocol offer packet, the Dynamic Host Control Protocol request packet, nor the Dynamic Host Control Protocol acknowledge packet are transmitted out of the server node.

7. A server node according to claim 1,
   wherein generation, by the node agent, of the Dynamic Host Control Protocol response packet comprises:
   translation of an Internet Protocol address of the Dynamic Host Control Protocol packet from a virtual network address space to a physical network address space; and
   translation of an Internet Protocol address of the Dynamic Host Control Protocol response packet from the physical network address space to the virtual network address space.

8. A server node according to claim 1,
   wherein generation of the Dynamic Host Control Protocol offer packet comprises:
   translation of an Internet Protocol address of the Dynamic Host Control Protocol discover packet from a virtual network address space to a physical network address space; and
   translation of an Internet Protocol address of the Dynamic Host Control Protocol offer packet from the physical network address space to the virtual network address space.

9. An apparatus comprising:
a memory storing processor-executable process steps and Dynamic Host Control Protocol information,
one or more processors to execute the processor-executable process steps to cause the apparatus to:
execute a virtual machine to transmit a Dynamic Host Control Protocol discover packet;
execute a virtual machine switch to receive the Dynamic Host Control Protocol discover packet from the virtual machine and to transmit the Dynamic Host Control Protocol discover packet; and
execute a node agent to receive the Dynamic Host Control Protocol discover packet from the virtual machine switch, to generate a Dynamic Host Control Protocol offer packet based on the Dynamic Host Control Protocol discover packet and on the Dynamic Host Control Protocol information stored in the memory, and to transmit the Dynamic Host Control Protocol offer packet from the node agent to the virtual machine switch,
wherein the virtual machine switch is to receive the Dynamic Host Control Protocol offer packet from the node agent and to transmit the Dynamic Host Control Protocol offer packet to the virtual machine.

10. An apparatus according to claim 9, the one or more processors to execute the processor-executable process steps to cause the apparatus to:
execute the virtual machine switch to, in response to receipt of the Dynamic Host Control Protocol discover packet, identify a handler of the node agent which is registered with the virtual machine switch and associated with the Dynamic Host Control Protocol discover packet, and to call the handler to transmit the Dynamic Host Control Protocol discover packet to the node agent.

11. An apparatus according to claim 9, the one or more processors to execute the processor-executable process steps to cause the apparatus to execute the node agent to:
receive the Dynamic Host Control Protocol information from a controller executing on a controller system, and to store the Dynamic Host Control Protocol information in the memory,
wherein the Dynamic Host Control Protocol information comprises a Media Access Control address of the virtual machine, an offered Internet Protocol address, a subnet mask, and a Dynamic Host Control Protocol server Internet Protocol address.

12. An apparatus according to claim 9, the one or more processors to execute the processor-executable process steps to cause the apparatus to:
execute the virtual machine to:
transmit a Dynamic Host Control Protocol request packet; and
execute the node agent to:
receive the Dynamic Host Control Protocol request packet;
generate a Dynamic Host Control Protocol acknowledge packet based on the Dynamic Host Control Protocol request packet; and
transmit the Dynamic Host Control Protocol acknowledge packet to the virtual machine.

13. An apparatus according to claim 12, wherein neither the Dynamic Host Control Protocol discover packet, the Dynamic Host Control Protocol offer packet, the Dynamic Host Control Protocol request packet, nor the Dynamic Host Control Protocol acknowledge packet are transmitted out of the apparatus.

14. A method comprising:
transmitting a Dynamic Host Control Protocol packet from a virtual machine executing on a host operating system of a server node;
receiving the Dynamic Host Control Protocol packet from the virtual machine at a virtual machine switch executing on the host operating system of the server node;
transmitting the Dynamic Host Control Protocol packet from the virtual machine switch to a node agent of the host operating system;
receiving the Dynamic Host Control Protocol packet at the node agent;
generating, by the node agent, a Dynamic Host Control Protocol response packet based on the Dynamic Host Control Protocol packet and on Dynamic Host Control Protocol information stored in a local memory of the server node;
transmitting the Dynamic Host Control Protocol response packet from the node agent to the virtual machine switch; and
transmit the Dynamic Host Control Protocol response packet from the virtual machine switch to the virtual machine.

15. A method according to claim 14,
wherein
in response to receipt of the Dynamic Host Control Protocol packet, the virtual machine switch identifies a handler of the node agent which is registered with the virtual machine switch and associated with the Dynamic Host Control Protocol packet, and calls the handler to transmit the Dynamic Host Control Protocol packet from the virtual machine switch to the node agent.

16. A method according to claim 14, further comprising:
receiving the Dynamic Host Control Protocol information at the server node from a controller executing on a controller node; and
storing the Dynamic Host Control Protocol information in the local memory,
wherein the Dynamic Host Control Protocol information comprises a Media Access Control address of the virtual machine, an offered Internet Protocol address, a subnet mask, and a Dynamic Host Control Protocol server Internet Protocol address.

17. A method according to claim 14, wherein the Dynamic Host Control Protocol packet comprises a Dynamic Host Control Protocol discover packet and the Dynamic Host Control Protocol response packet comprises a Dynamic Host Control Protocol offer packet, the method further comprising:
transmitting a Dynamic Host Control Protocol request packet from the virtual machine;
receiving the Dynamic Host Control Protocol request packet at the node agent;
generating, by the node agent, a Dynamic Host Control Protocol acknowledge packet based on the Dynamic Host Control Protocol request packet; and
transmitting the Dynamic Host Control Protocol acknowledge packet from the node agent to the virtual machine.

18. A method according to claim 17, wherein neither the Dynamic Host Control Protocol discover packet, the Dynamic Host Control Protocol offer packet, the Dynamic Host Control Protocol request packet, nor the Dynamic Host Control Protocol acknowledge packet are transmitted out of the server node.

19. A method according to claim 14,
wherein generating, by the node agent, of the Dynamic Host Control Protocol response packet comprises:
translating an Internet Protocol address of the Dynamic Host Control Protocol packet from a virtual network address space to a physical network address space; and
translating an Internet Protocol address of the Dynamic Host Control Protocol response packet from the physical network address space to the virtual network address space.

* * * * *